Figure 6:
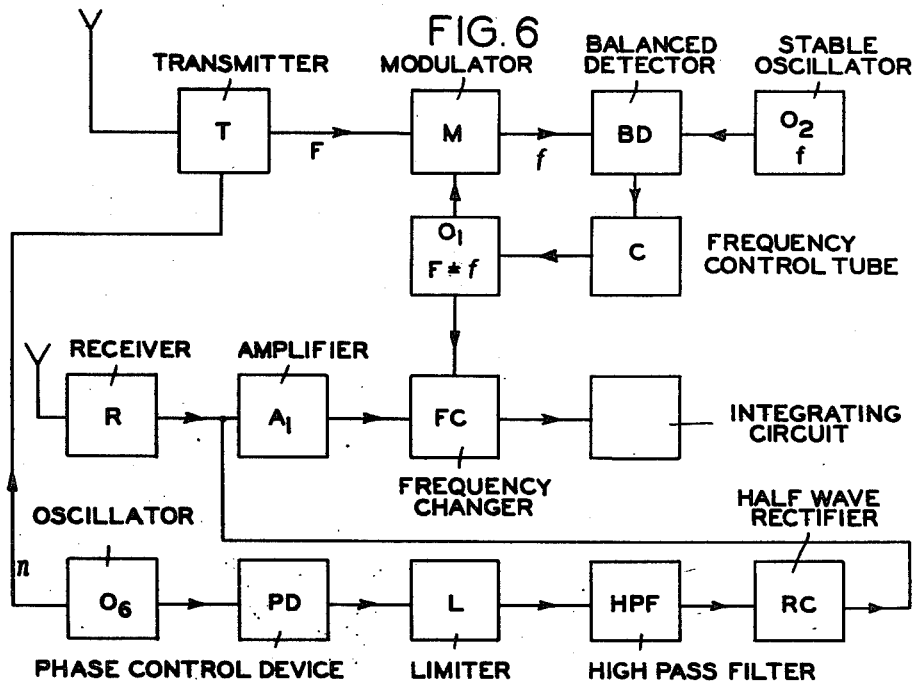

May 27, 1947.  C. W. EARP  2,421,020
DETECTION OF OBSTACLES BY ELECTROMAGNETIC WAVES
Filed Sept. 9, 1942    2 Sheets-Sheet 1
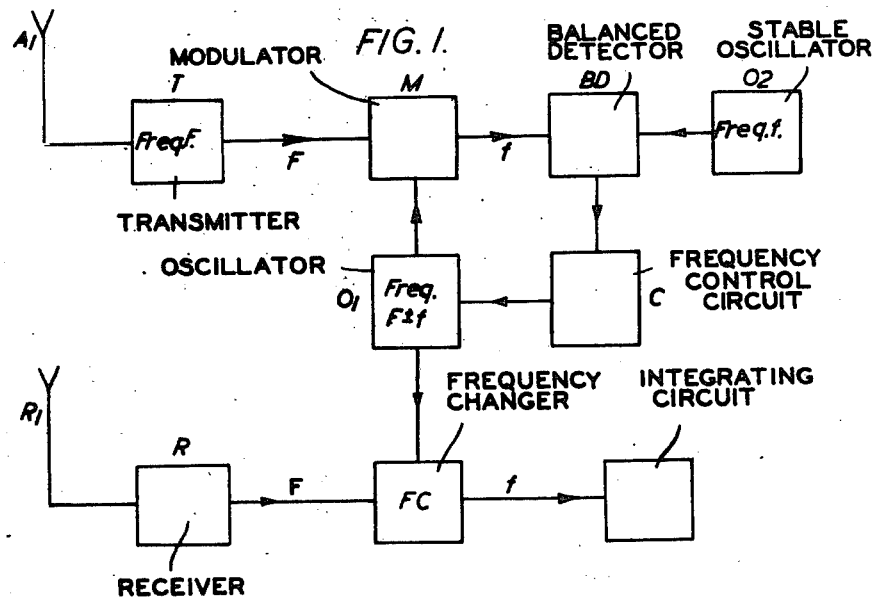
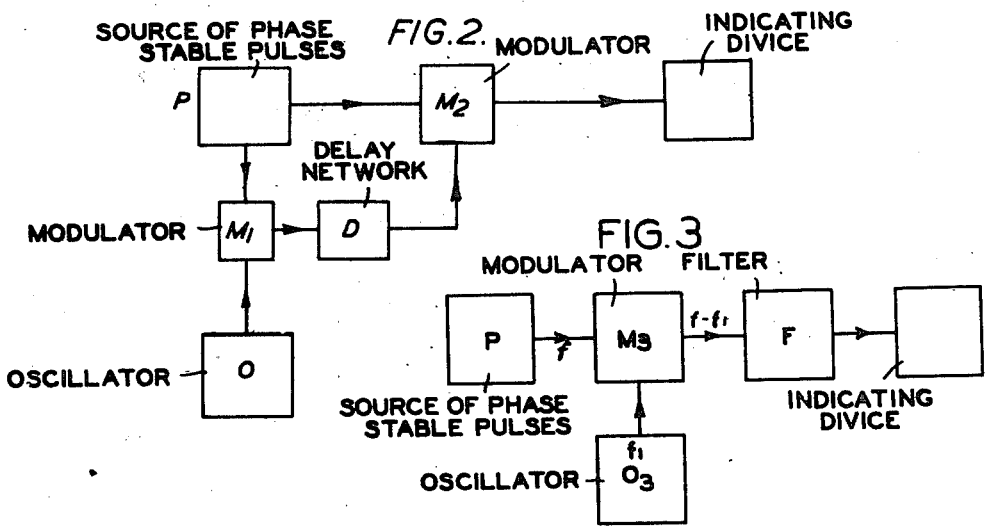
INVENTOR
C. W. Earp
BY
Loyd Hall Sutton
ATTORNEY May 27, 1947.   C. W. EARP   2,421,020
DETECTION OF OBSTACLES BY ELECTROMAGNETIC WAVES
Filed Sept. 9, 1942   2 Sheets-Sheet 2

INVENTOR
CHARLES WILLIAM EARP
ATTORNEY

Patented May 27, 1947

2,421,020

UNITED STATES PATENT OFFICE 2,421,020

DETECTION OF OBSTACLES BY ELECTROMAGNETIC WAVES

Charles William Earp, London W. C. 2, England, assignor to Standard Telephones and Cables Limited, London, England, a British company Application September 9, 1942, Serial No. 457,787
In Great Britain March 11, 1941

9 Claims. (Cl. 250—1.66)

In the art of obstacle detection by radio pulses, it is not possible to radiate economically a high mean power from the transmitter, except by raising the repetition frequency of the pulses to such value that orthodox receiving circuits are not able to provide the highest possible signal-to-noise ratio in visual or other indicating systems. For example, when rectified pulses occurring at 1,000 per second are applied to the deflecting plates of a cathode-ray indicator, the presence of a weak signal is a little, but not much more readily appreciated by the human eye, than if only 20 pulses per second were used, though the power required for the former case would be fifty times that required for the latter. Further, the human senses of vision and hearing are such that an integration of effects over a period of several seconds is most inefficient.

It is desirable, therefore to devise circuits whereby the final indication conveys only that number of units of intelligence, (that is, only that rate of transmission of information) which the senses can assimilate, while using the whole power of the signal to provide the maximum signal-to-noise ratio consistent with this rate of information.

Arrangements have already been proposed for "integrating" the effect of successive pulses, but these methods have usually involved the radiation of accurately "coherent" pulse trains. By this is meant that the train of separate pulses is derived from a continuous oscillation each pulse comprising a short train of high frequency waves and having the same time-phase relationship as the continuous waves. The high-frequency phase of a particular pulse, i. e., the phase with respect to the continuous wave from which the pulse is derived, is important, and bears a definite and known relationship to the time of occurrence of the pulse. Since the transmitted pulses are of random phase, methods have been proposed whereby this random phase is eliminated and the "coherence" of pulses is assured by the particular design of the transmitter.

According to the present invention pulses of random phase and timing are transmitted and the received impulses are automatically corrected for random phase displacement by means of an automatic phase-correcting circuit in the receiver and then integrated. The automatic correction is operated by each outgoing pulse from the transmitter, preparing the receiver to receive the echo pulse in such a way that the random-phase pulse train received is converted to a coherent pulse train. By this means, a simple and power-efficient transmitter can be utilized, at the cost of a simple addition to the receiver.

According to another aspect of the invention, in an arrangement for obstacle detection utilising the transmission of pulses comprising short trains of waves at radio frequency and receiving the pulses reflected from the obstacle, the receiving circuits are so controlled by the outgoing transmitted pulses that the unstable phase of the received train of pulses is corrected or modified to permit of said integration.

The invention will be better understood from the following description taken in conjunction with the accompanying drawings which show in Fig. 1 a block diagram of one arrangement embodying the invention. Figs. 2 to 5 show in block form four alternative arrangements for integrating the pulses. Fig. 6 shows in block diagram an alternative system in which means is provided for selecting reflections from a particular obstacle for observation.

Referring to Fig. 1, transmitter pulses generated in T and comprising short trains of waves at radio frequency F are radiated from the aerial A1, and also applied to a modulator M, to which frequency (F+f) generated in oscillator O1 is also applied. The output from M is a train of pulses comprising waves at frequency $f$.

A frequency $f$ generated in an oscillator O2 is applied with this pulse train of wave frequency $f$ to a balanced detector arrangement BD. The output from this balanced detector is a train of D. C. pulses, the sense and magnitude of which depend upon the relative H. F. phases of the wave comprising the pulses and waves of the same frequency from the steady reference oscillator O2. In the case when the input phases are in quadrature, the output is zero. The output from BD is provided with a very short time constant, and is used to control in known manner the frequency (or phase) of oscillator O1 through the medium of a frequency control tube C.

During the time that a pulse from M due to the pulses from T is being applied to BD, the output from BD tends to advance or retard the phase of oscillator O1 until the H. F. phase of the pulses of frequency $f$ is "corrected" with respect to oscillator O2. Time constants are arranged to be short enough for the correction of phase during the course of a single pulse. There is thus produced an oscillator O1, which is "corrected" in phase during the transmission of each pulse. The output of this oscillator is now used in the receiver R for the reflected pulses for application to the frequency changer F. C. The receiver aerial is shown at R1. After a time equal to that taken by the transmitted wave to reach and to return from the obstacle, a pulse is received at the receiver antenna R1, and its frequency is changed in FC to frequency $f$. Such pulses at frequency $f$ are stable in phase as defined by the oscillator O2 and the short-term stability of oscillator O1.

This phase-corrected train of pulses may now, of course, be integrated by various methods. Fig. 2 shows one method described in the specification of United States application No. 457,786, filed September 9, 1942, in which the phase stable pulses from P are fed over two paths to a modulator M2, one or both of such paths including a further modulator M1 for combining the phase stable pulses with a carrier wave from oscillator O of constant frequency and means, such as a delay network D is provided for producing a predetermined difference in transmission delay through the two paths. The delay in the two paths is made equal to the repetition period of the transmitted pulses. By this means a maximum signal-to-noise ratio of the signals is obtained. This arrangement has one particular advantage in that the difference in frequency between the output and the oscillator O1 can be used as is well known to give a direct indication of the relative velocity of the transmitter-receiver and obstacle.

Fig. 3 shows another arrangement for integration of the stable source of pulses P at the output of FC. The coherent pulse train is applied to a highly selective filter F, after beating down the frequency in a modulator M3 (to which is applied oscillations from oscillator O3) to such value that a sharp filter can be easily devised.

Figure 4:
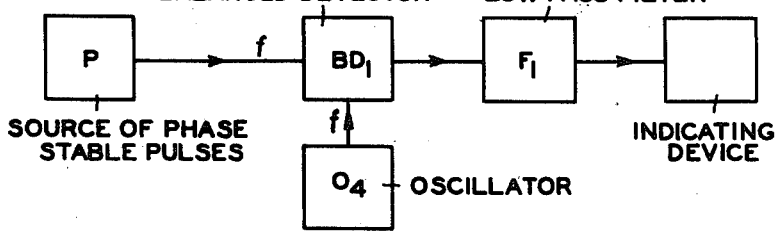

Still another arrangement for integration of the pulses at the output of FC is provided as shown in Fig. 4 by application of the coherent pulse train P to a balanced detector BD1 with a locally generated pulse train of the same high frequency generated by oscillator O4, the output being selected as a direct current. A low-pass filter F1 will provide infinite improvement in signal-to-noise ratio at the expense of a correspondingly slow indication.

Figure 5:
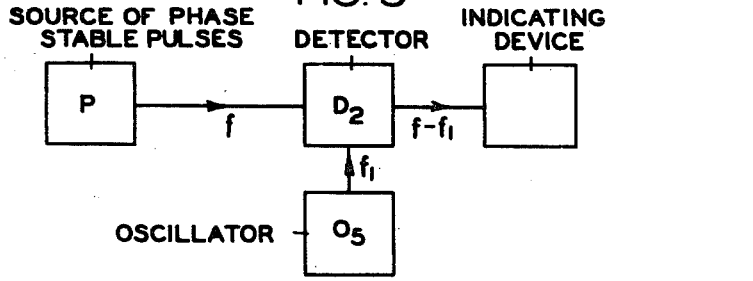

As illustrated in Fig. 5 the coherent pulse train P from the output of FC may be detected in a detector D2 together with a similar pulse train of a different mean high frequency, i. e., the frequency of the wave trains forming the pulses, supplied by an oscillator O5, and the output from this detector D2 may be tuned to select a continuous-wave indication at the difference frequency.

Associated with the arrangements for integration described herein, there will normally be an arrangement for selecting the reflection from an obstacle at some specific distance. Though suitable arrangements are well known in the art, the operation of the "signal time-gate" arrangement as combined with the arrangements according to the present invention is described here, as this signal time-gate arrangement may be introduced to the system either within the circuit of Fig. 1, or at a later stage of the receiving equipment.

The "gate" may be provided in the form of a train of pulses of the same periodicity as the transmitted pulses, in which the time of occurrence can be set manually to coincide with the received echoes from a particular distance. This manually (or automatically) controlled "gate" pulse train may be produced as follows:

Referring to Fig. 6 assuming that pulses are required at $n$ per second, an oscillation of this frequency generated by oscillator O6 may be used to produce the original transmitter pulses, or alternatively may be synchronised by the transmitter pulses. These oscillations are applied over a manual (or automatic) phase control device PD to the input to a limiting device L, which produces a square wave-form of periodicity $n$ per second. A high-pass filter HPF now produces alternate positive and negative pulses of D. C. at times corresponding to the vertical sides of the square wave, and a half-wave rectifier RC is used to remove the negative pulses, leaving sharp positive pulses of the correct periodicity, and controllable time of occurrence.

The controllable D. C. pulse train is used to switch on the receiver at the moments corresponding to the arrival of reflections from a particular obstacle, by application, to the bias of an over-biassed amplifier A1, before the frequency changer FC. If desired the amplifier may be located after the frequency changer FC. Alternatively FC may be over-biassed and set into operation by the locally-produced pulse train; or the injection of oscillator O1 to FC may take place through a similarly "pulsed" amplifier. By any of the above means, all signals except the desired one are eliminated, and the position of the manual or automatic control may be used to indicate the range of the obstacle.

What is claimed is:

1. A system for the detection of obstacles comprising means for transmitting radio pulses comprising short trains of high frequency electromagnetic waves of random phase, means for receiving said waves after reflection by an obstacle, automatic phase correcting means for correcting said received waves to provide pulses consisting of trains of high frequency waves of stable high frequency phase and an integrating circuit for said pulse trains.

2. A system for the detection of obstacles comprising means for transmitting radio pulses comprising short trains of high frequency electromagnetic waves of random phase, means for receiving said waves after reflection by an obstacle, means for converting said received waves into a coherent pulse train having the same time phase relation of the high frequency waves within each pulse of the train and an integrating circuit for said pulse train.

3. A system for the detection of obstacles comprising a transmitter for generating pulses consisting of short trains of electromagnetic waves of random phase, means for receiving said waves after reflection by an obstacle, a stable oscillator, means for deriving direct current pulses from the waves generated by said transmitter the sense and magnitude of said direct current pulses depending upon the relative phases of the waves generated by said transmitter and those generated by said stable oscillator, means controlled by said direct current pulses for converting the received waves into a coherent pulse train, and an integrating circuit for said pulse train.

4. A system for the detection of obstacles comprising a transmitter for generating pulses consisting of short trains of electromagnetic waves of frequency F but of random phase, means for receiving said waves after reflection by an obstacle, a first source of oscillations of a different frequency $F \pm f$, a modulator, means for applying waves from said transmitter and waves from said first source of oscillations of frequency $F \pm f$ to said modulator, a balanced detector, a second source of stable oscillations of frequency $f$, means for applying waves of frequency $f$ from the output of said modulator and waves from said second source of oscillations to said balanced detector, frequency control means for said first source of oscillations, means for applying a direct current control potential derived from said balanced detector to said frequency control means, a frequency changing device, means for applying said received waves and waves from said first source of oscillations to said frequency changing device and an integrating circuit connected to said frequency changing device.

5. A system for the detection of obstacles according to claim 1, wherein said integrating circuit comprises first and second modulators, a source of oscillations, means for applying waves from said source of oscillations and said waves of stable high frequency phase to said first modulator, means for applying waves from the output of said first modulator and said waves of stable high frequency phase to said second modulator with a difference in transmission delay equal to an integral number of periods of repetition of said pulses and an indicating device connected to the output of said second modulator.

6. A system for the detection of obstacles according to claim 1, wherein said integrating circuit comprises a modulator, a source of oscillations, means for applying waves from said source of oscillations and said waves of stable high frequency phase to said modulator, an indicating device, and means for applying a difference frequency derived from said modulator to said indicating device through a highly selective filter.

7. A system for the detection of obstacles according to claim 1, wherein said integrating circuit comprises a balanced detector, a local source of waves of the same frequency as the frequency of said waves of stable high frequency phase, means for applying said locally generated waves and said waves of stable high frequency phase to said balanced detector, an indicating device, and a connection including a low pass filter from the output of said balanced detector to said indicating device.

8. A system for the detection of obstacles according to claim 1, wherein means is provided for normally blocking said receiver and for unblocking it synchronously with the reception of echo pulses received after reflection from an obstacle located at a predetermined distance.

9. A system for the detection of obstacles according to claim 1, further comprising means for deriving a train of pulses of the same periodicity as the transmitted pulses, a phase control device for adjusting the phase of said pulses, means in said receiver for blocking and unblocking it to the passage of signals, and a connection for applying said pulses to said last-mentioned means to unblock said receiver in synchronism with the reception of echo pulses received after reflection from an obstacle located at a predetermined distance.

CHARLES WILLIAM EARP.

REFERENCES CITED

The following references are of record in the file of this patent:

UNITED STATES PATENTS

| Number | Name | Date |
|---|---|---|
| 1,924,156 | Hart | Aug. 29, 1933 |
| 2,134,716 | Gunn | Nov. 1, 1938 |
| 2,208,422 | Hugon | July 16, 1940 |
| 2,227,598 | Lyman et al. | Jan. 7, 1941 |